(12) United States Patent
Zhang (10) Patent No.: US 9,240,034 B2
(45) Date of Patent: Jan. 19, 2016

(54) BIOMEDICAL DATA ANALYSIS ON HETEROGENEOUS PLATFORM

(71) Applicant: Advanced Micro Devices, Inc., Sunnyvale, CA (US)

(72) Inventor: Dongping Zhang, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 197 days.

(21) Appl. No.: 13/909,541

(22) Filed: Jun. 4, 2013

(65) Prior Publication Data

US 2013/0329972 A1    Dec. 12, 2013

Related U.S. Application Data

(60) Provisional application No. 61/657,451, filed on Jun. 8, 2012.

(51) Int. Cl.
*G06K 9/00* (2006.01)
*G06T 5/00* (2006.01)
*G06T 7/00* (2006.01)

(52) U.S. Cl.
CPC .............. *G06T 5/00* (2013.01); *G06T 7/0042* (2013.01); *G06T 2200/04* (2013.01); *G06T 2207/10081* (2013.01); *G06T 2207/30101* (2013.01)

(58) Field of Classification Search
None
See application file for complete search history.

(56) References Cited

U.S. PATENT DOCUMENTS

| 2008/0276220 | A1* | 11/2008 | Munshi et al. | 717/119 |
| 2010/0046814 | A1* | 2/2010 | Dewaele et al. | 382/128 |
| 2011/0213243 | A1* | 9/2011 | Mallya et al. | 600/425 |
| 2011/0262041 | A1* | 10/2011 | Bharath et al. | 382/190 |

\* cited by examiner

*Primary Examiner* — Atiba O Fitzpatrick
(74) *Attorney, Agent, or Firm* — Volpe and Koenig, P.C.

(57) ABSTRACT

Methods and apparatus for biomedical data analysis to produce enhanced images of tubular structures are disclosed. A Gaussian convolution of an input image is used to calculate a Hessian matrix. An Eigen decomposition of the Hessian matrix produces eigenvectors and eigenvalues, which are sorted to determine bright tubular structure detection according to high and low values that represent brightness, and structure shape. A tubularity computation calculates the probability of a voxel of interest being part of a tubular network. Embodiments may be implemented to share computer resources such as between a computer processing unit (CPU) and a graphic processing unit (GPU).

26 Claims, 9 Drawing Sheets

BIOMEDICAL DATA ANALYSIS ON HETEROGENEOUS PLATFORM

CROSS REFERENCE TO RELATED APPLICATION

This application claims the benefit of U.S. Provisional Patent Application No. 61/657,451 filed Jun. 8, 2012, which is incorporated by reference as if fully set forth.

FIELD OF THE INVENTION

The present invention is generally directed to graphical enhancement of images including, but not limited to, biomedical images such as those related to vascular bodies and vasculature extraction.

BACKGROUND

Biomedical image generation and analysis involves detection and extraction of vascular structures and tissues from a two dimensional images or three dimensional renderings. Computations required to detect and extract such structures are intensive and can have undesirable latencies. Known techniques that can produce images with adequate fine detail to properly extract fine structures such as vascular structures are not capable of real time computations, or suffer significant latency.

SUMMARY OF EMBODIMENTS

Methods and apparatus for biomedical data analysis to produce enhanced images of tubular or tubular-like structures, such as vascular bodies, are disclosed. A Gaussian convolution of an input image is used to calculate a Hessian matrix. An Eigen decomposition of the Hessian matrix produces eigenvectors and eigenvalues, which are sorted to determine bright tubular structure detection according to high and low values that represent brightness, and structure shape. A tubularity computation, also referred to as a vesselness computation, calculates the probability of a voxel of interest being part of a tubular network, such as a vascular network. Embodiments may be implemented to share computer resources such as between a computer processing unit (CPU) and a graphic processing unit (GPU).

In one embodiment, a method for image enhancement is provided. A Gaussian convolution of voxels of an input image is performed. A Hessian matrix of the convolution is calculated. An Eigen decomposition of the Hessian matrix is performed to derive eigenvectors and eigenvalues of the voxels. The eigenvectors are sorted according to the magnitude of the corresponding eigenvalues. A tubularity computation, also referred to as a vesselness computation, is performed to calculate the probability of a voxel of the image being part of a tubular structure representation in the image whereby voxels determined to be part of tubular structures, such as vascular structures, are used to provide an enhanced depiction of the structures.

Such an embodiment may be implemented in stages where the Gaussian convolution is performed a first processing stage, the a Hessian matrix is calculated in a second processing stage, the Eigen decomposition and sorting the eigenvectors is performed in a third processing stage, and the a vesselness computation is performed in a fourth processing stage. A plurality of computer resources of a device may share in the processing of the voxel data. For example, one computer resource, such as a central processing unit (CPU), may perform overall tracking and coordination of the results between stages for voxels of the image and another computer resource, such as a graphics processing unit (GPU), may perform one or more of the processing stages.

In another embodiment an apparatus for biomedical image enhancement is provided. A first computational component is configured to perform a Gaussian convolution of voxels of an input image. A second computational component is configured to calculate a Hessian matrix of the convolution. A third computational component is configured to perform an Eigen decomposition of the Hessian matrix to derive eigenvectors and eigenvalues of the voxels and to sort the eigenvectors according to the magnitude of the corresponding eigenvalues. A fourth computational is component configured to perform a tubularity computation, also referred to as a vesselness computation, to calculate the probability of a voxel of the image being part of a tubular structure representation in the image whereby voxels determined to be part of tubular structures, such as vascular structures, are used to provide an enhanced depiction of the structures.

In one example, the four computational components are implemented in a central processing unit (CPU) of a hand held battery powered device.

Embodiments include devices having a plurality of computer resources wherein one computer resource, such as a central processing unit (CPU), is configured to perform overall tracking and coordination of the results between the four computational components and one or more of the four computational components are implemented in a different computer resource, such as a graphics processing unit (GPU). Embodiments also include devices having a central processing unit (CPU) configured to perform overall tracking and coordination of the results between the four computational components and further configured to selectively implement the four computational components.

Embodiments may also include an input configured to receive the voxels of the input image and an output configured to output voxels of the processed image.

In further embodiments, computer readable medium having stored thereon a program that when executed perform steps of the method embodiments are provided. The computer readable medium may implement a program where the Gaussian convolution is performed in a first processing stage, the Hessian matrix is calculated in a second processing stage, the Eigen decomposition and sorting the eigenvectors is performed in a third processing stage, and the vesselness computation is performed in a fourth processing stage wherein the program controls a central processing unit (CPU) to perform overall tracking and coordination of the results between stages for voxels of the image and a graphics processing unit (GPU) to perform at least one of the processing stages.

BRIEF DESCRIPTION OF THE DRAWINGS

A more detailed understanding may be had from the following description, given by way of example in conjunction with the accompanying drawings wherein.

DETAILED DESCRIPTION OF THE PREFERRED EMBODIMENTS

Figure 2:
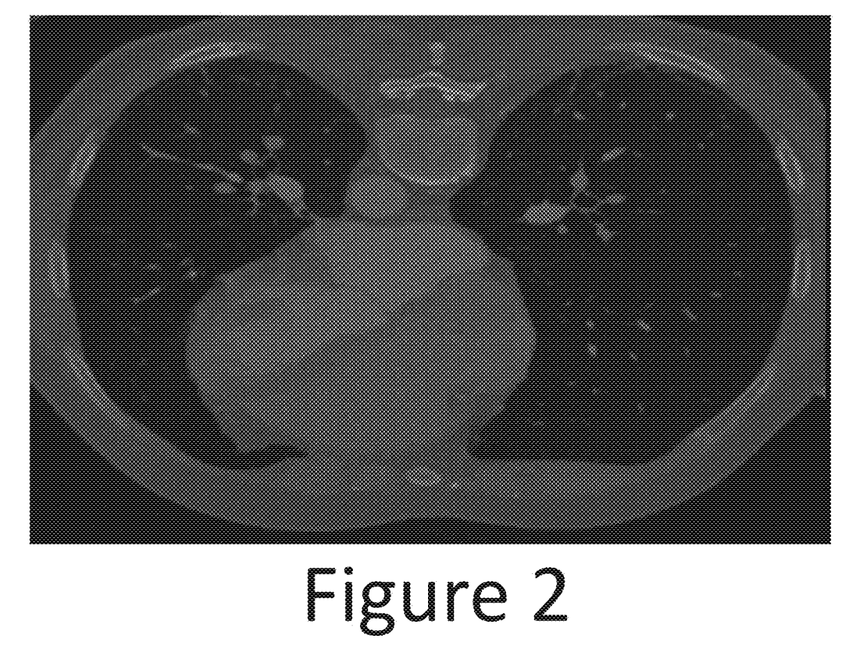
FIG. 2 is a cross section image of a computed tomography angiograph (CTA) of human lungs and heart without using the enhancement methods described herein.
Figure 3:
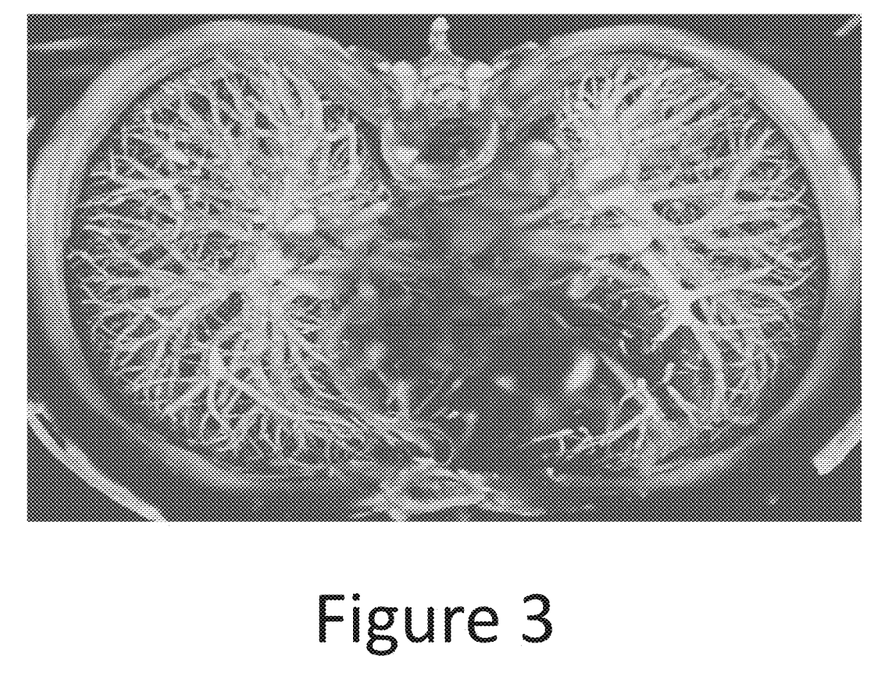
FIG. 3 is a cross section image of the computed tomography angiograph (CTA) of human lungs and heart after using the methods described herein.

Methods and apparatus are used to perform image data analysis according to the embodiments described herein. From the data analysis, images produced by, for example, scanned organs and tissues are analyzed for detection and extraction of tubular structures, such as blood vessels. FIG. 3 is an example of a cross section image of a computed tomography angiograph (CTA) of human lungs and heart that has been enhanced using the methods described herein. As can be seen, the quality of this image provides fine detail of vascular structures. In contrast, FIG. 2 illustrates the image without enhancement in which the same vascular bodies are barely visible and in crude detail.

Figure 1:
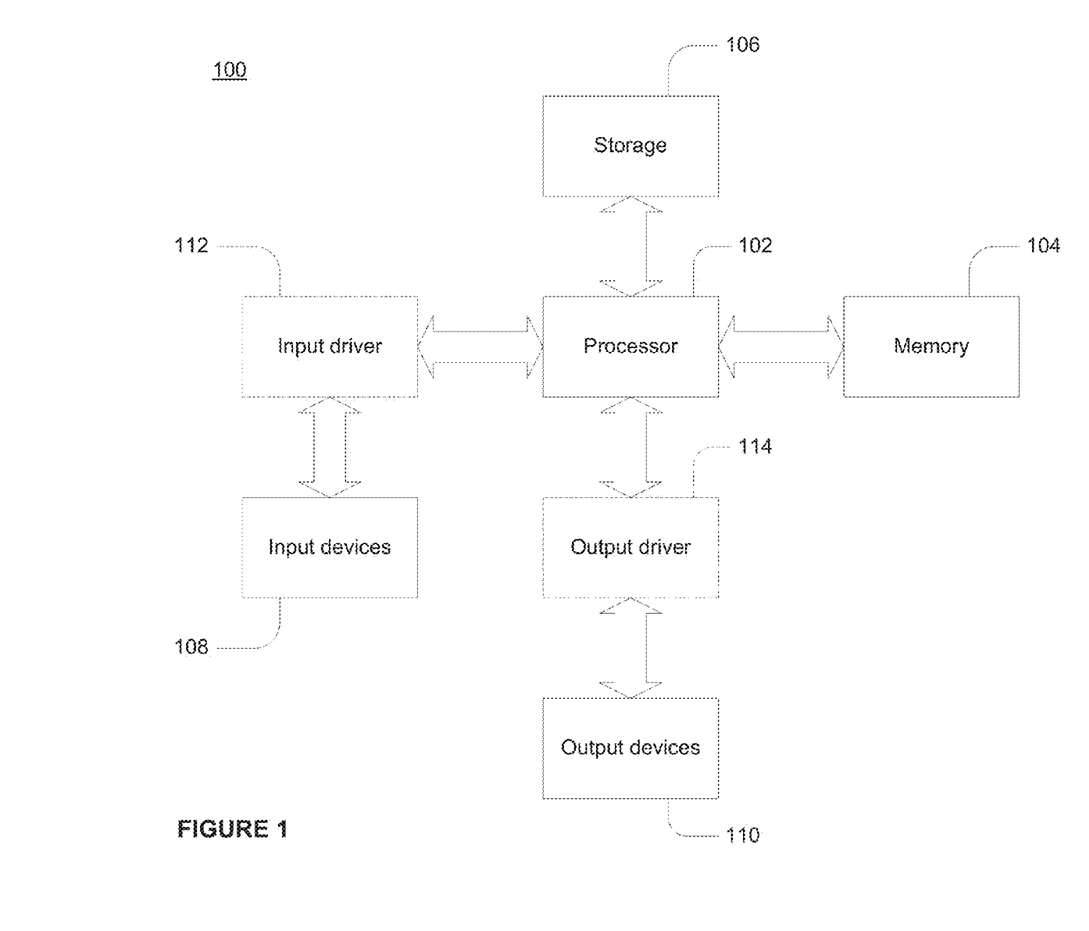
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache. The processor 102 may execute the biomedical data analysis method which may be stored as executable code on the memory 104.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 4:
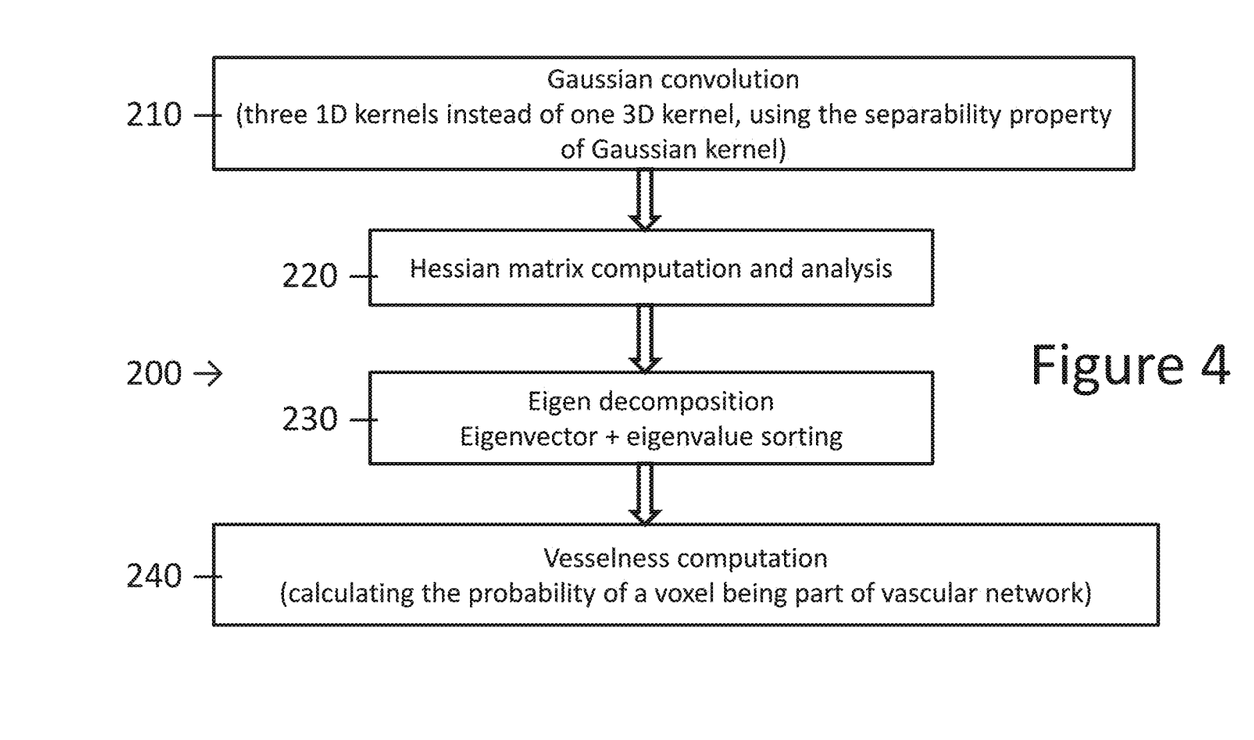
FIG. 4 is a flow diagram of an example method used for image enhancement such as to produce the FIG. 3 enhanced image from the FIG. 2 image.

FIG. 4 provides an example flow diagram of a four stage method 200 used for image enhancement such as to produce the FIG. 3 enhanced image from the FIG. 2 image. In one example the method is implemented in a device via a computational component preforming each stage. The computational components may be implemented in one or more computer resources such as CPUs and GPUs. Overall tracking and coordination of the results between the four stages may be performed by a CPU or other computer resource. The sharing of the processing work between resources may increase processing speed as well as provide significant power saving in the image processing to enable the processing to be performed on a hand held battery operated device.

In a first stage 210, a Gaussian convolution is performed on an input image I, using three one-dimensional (1D) kernels instead of one three-dimensional (3D) kernel. This greatly reduces the overall complexity of the image processing. From the convolution, a Hessian matrix H is computed in a second stage 220. For the third stage 230, an Eigen decomposition of the Hessian matrix computed in the second stage 220 is performed to derive its eigenvectors and eigenvalues, followed by sorting the eigenvectors according to the magnitude of the corresponding eigenvalues. Finally, in a fourth stage 240, a tubularity computation, also referred to as a vesselness computation, calculates the probability of a voxel being part of a tubular network in order to provide the enhanced detail of a tubular structure, such as a vessel structure, in the processed image. The tubularity value, i.e. vesselness value, of each voxel is then used as intensity value of each corresponding voxel in the enhanced image, only with linear scaling if necessary, to produce the post-processed image, for example, FIG. 3. The term vesselness as used hereinafter is used for convenience as a descriptive term with respect to the enhancement of the example image shown in FIGS. 2 and 3, but is generally to be understood as meaning tubularity.

The Gaussian convolution performed in the first stage 210 may be represented by the equation:

$$L = ((I * G_x(\sigma)) * G_y(\sigma)) * G_z(\sigma) \quad \text{Equation (1)}$$

where I is the input image, $G_x$, $G_y$, $G_z$ are 1D Gaussian kernels in 3D space in dimensions x, y and z, and σ is the size of the Gaussian kernel. The Hessian matrix computation of the convolution L performed in the second stage 220 may be represented as:

$$H = \begin{pmatrix} \frac{\partial^2 L}{\partial x \partial x} & \frac{\partial^2 L}{\partial x \partial y} & \frac{\partial^2 L}{\partial x \partial z} \\ \frac{\partial^2 L}{\partial y \partial x} & \frac{\partial^2 L}{\partial y \partial y} & \frac{\partial^2 L}{\partial y \partial z} \\ \frac{\partial^2 L}{\partial z \partial x} & \frac{\partial^2 L}{\partial z \partial y} & \frac{\partial^2 L}{\partial z \partial z} \end{pmatrix} \quad \text{Equation (2)}$$

For the third stage 230, an Eigen decomposition of such computed Hessian matrix is performed to derive its eigenvectors and eigenvalues. The subsequent sorting of the eigenvectors according to the magnitude of the corresponding eigenvalues permits analysis of the main modes of second-order variation in image intensity to determine the type of local structure in different portions of the image.

Figure 5:
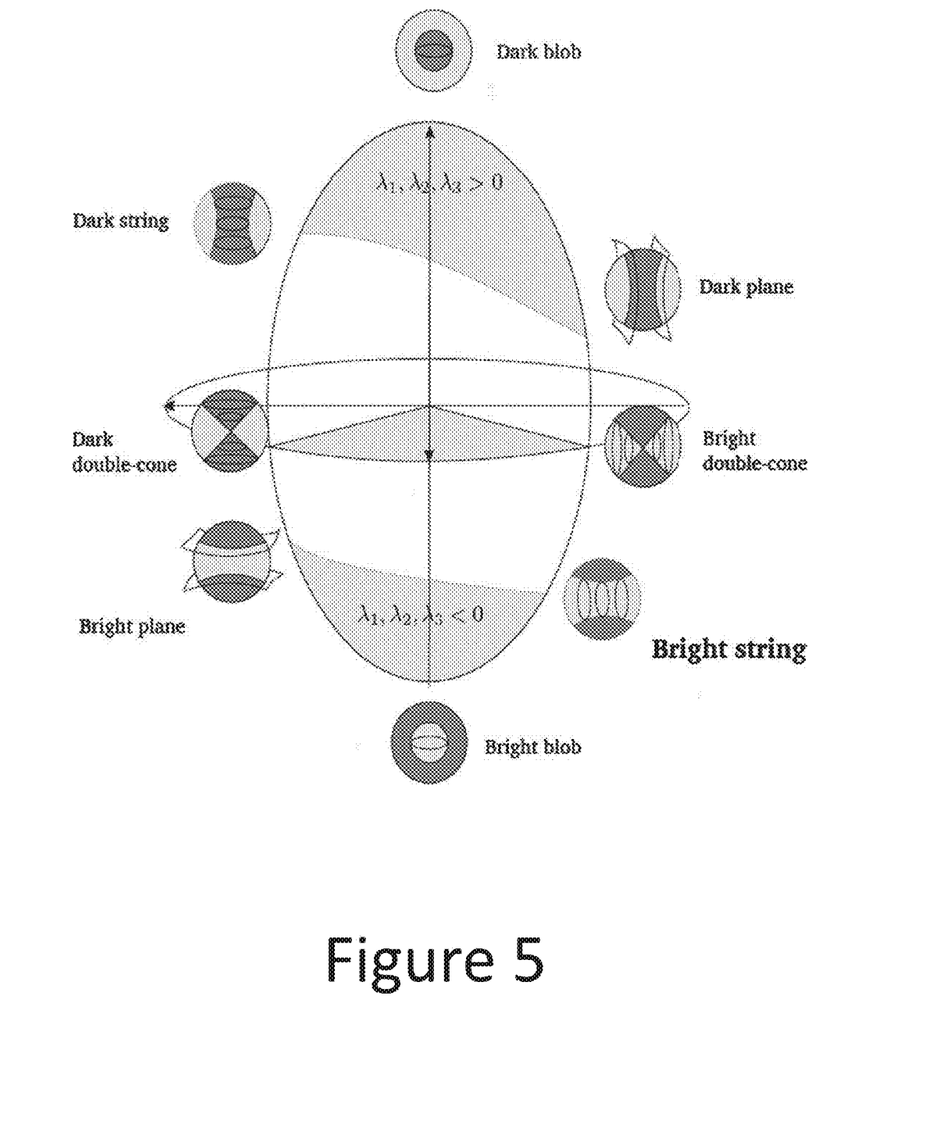
FIG. 5 is a graphic illustration of the shape space for a Hessian matrix of image voxels in three dimensions.

The diagram shown in FIG. 5 illustrates the shape space for the Hessian matrix in 3D. The bright and dark string values indicate tubular structures that are sought from the classification based on the signs of the eigenvalues and the sorting of eigenvectors and eigenvalues, since they reflect detection of a vascular structure. Table 1 represents a mapping of eigenvalues, which may be positive or negative (+/−) high (H) or low (L) in value, mapped to a geometric pattern. The eigenvalues that map to the bright or dark tubular structures are the ones searched for as an indication of a potentially detected vascular structure, since vessels can appear as either bright or dark tubular structures in images depending on their modalities or acquisition methods. Such eigenvalues are then further processed to provide the enhanced image of the vessels through the vesselness computation.

TABLE 1

| 2D | | 3D | | | |
|---|---|---|---|---|---|
| $\lambda_1$ | $\lambda_2$ | $\lambda_1$ | $\lambda_2$ | $\lambda_3$ | geometric patten |
| L | L | L | L | L | noise, no preferred direction |
|   |   | L | L | H− | bright plate-like structure |
|   |   | L | L | H+ | dark plate-like structure |
| L | H− | L | H− | H− | bright tubular structure |
| L | H+ | L | H+ | H+ | dark tubular structure |
| H− | H− | H− | H− | H− | bright blob-like structure |
| H+ | H+ | H+ | H+ | H+ | dark blob-like structure |

Figure 6:
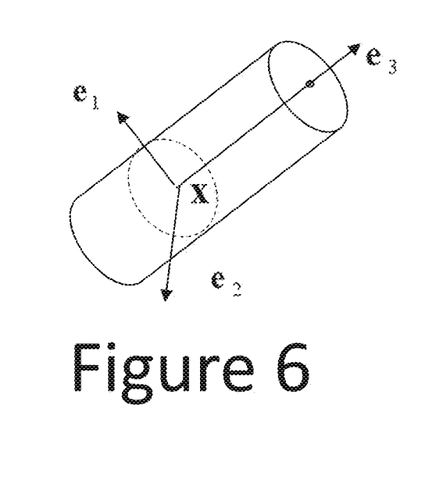
FIG. 6 is a graphic illustration of a tubular structure, such as a vessel structure, at a voxel X with reference to the eigenvectors associated with voxel X.
Figure 7:
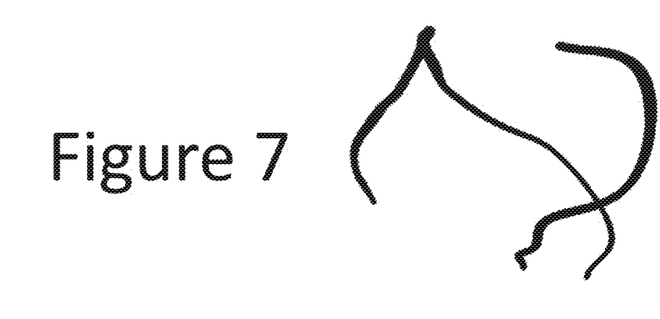
FIG. 7 is a graphic illustration of rendered vessels of the coronary arteries illustrated in FIG. 8.
Figure 8:
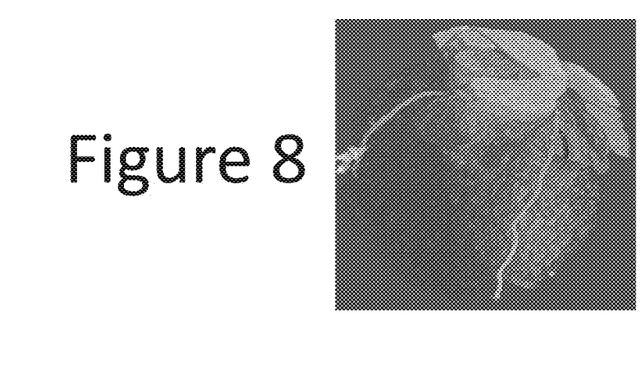
FIG. 8 is a graphic illustration of a volume rendering of a heart with coronary arteries enhanced and overlaid on top.

FIG. 6 illustrates a tubular structure at a voxel X with reference to the eigenvalues associated with voxel X. The vesselness, i.e. tubularity, portion of the method may compute maximal vesselness, i.e. tubularity, response V from multiple scales σ and may be represented as follows:

$$V = \max_{\sigma_{min} \leq \sigma \leq \sigma_{max}} \{V_\sigma\} \quad \text{Equation (3)}$$

$$V_\sigma = \begin{cases} 0 & \text{if } \lambda_2 > 0 \text{ or } \lambda_3 > 0 \\ \left(1 - e^{-\frac{R_A^2}{2\alpha^2}}\right) e^{-\frac{R_B^2}{2\beta^2}} \left(1 - e^{-\frac{S^2}{2\chi^2}}\right) & \text{otherwise} \end{cases} \quad \text{Equation (4)}$$

where: $R_A = \frac{|\lambda_2|}{|\lambda_3|}$; $R_B = \frac{|\lambda_1|}{\sqrt{|\lambda_2 \lambda_3|}}$; $S = \sqrt{\sum_i \lambda_i^2}$;

and α, β, and χ are predetermined values.

Where gaps in the estimation of the tubular structure segment (e.g., a vascular segment) occur due to errors in the calculation, tensor voting based on mathematical diffusion may be applied. The longest connected components, such as the rendered vessels illustrated in FIG. 7 of the heart illustrated in FIG. 8, are selected by the algorithm, and a skeletonization is performed to estimate the position of the centerline along the elongated component.

Figure 9:
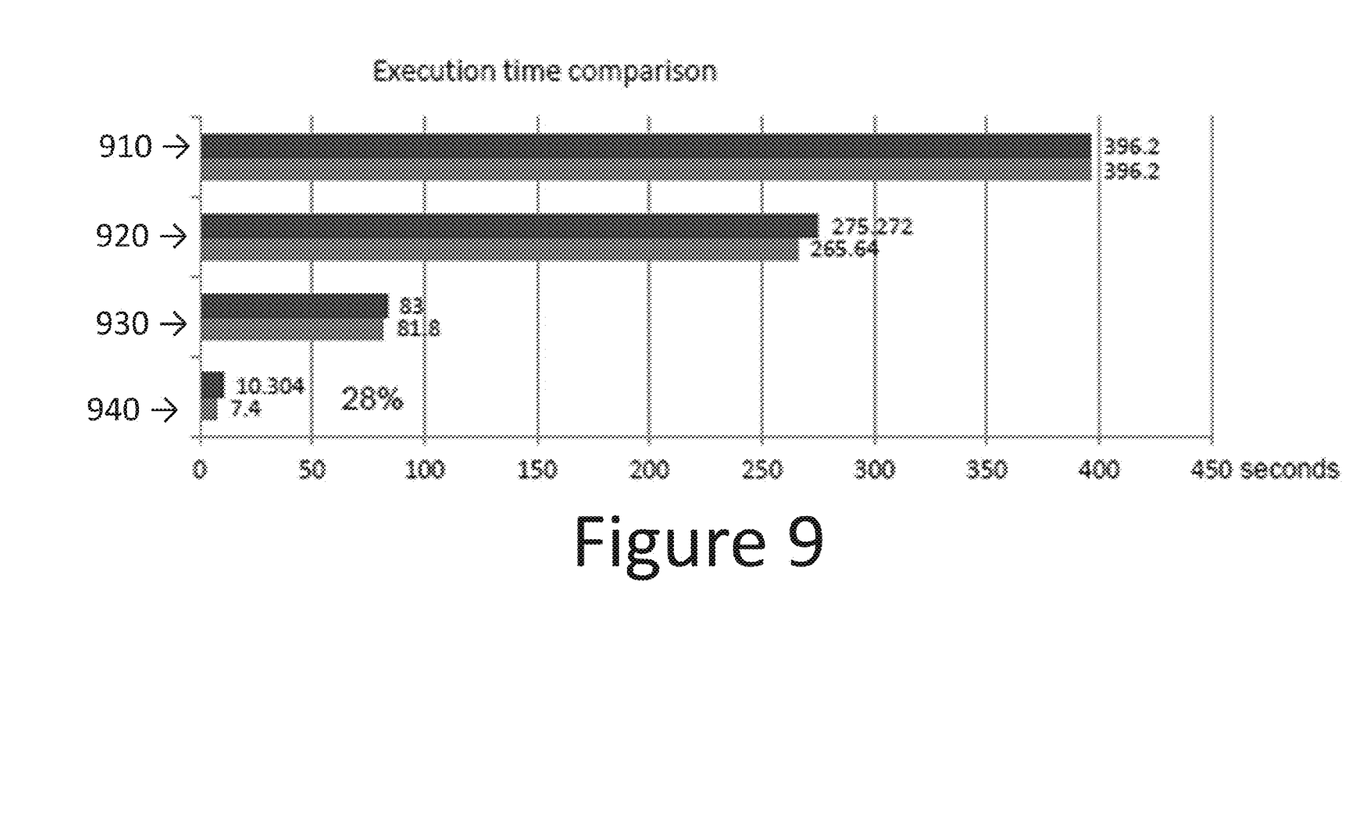
FIG. 9 is a graphic illustration of execution times for various processing implementation examples using different hardware configurations.

Each stage of the method may utilize multithreaded or single threaded execution on a CPU, a GPU or a combination of both CPU and GPU. For example, FIG. 9 shows execution times for various combinations of multithreaded and single threaded CPU and GPU computing with respect to producing the enhanced image of FIG. 3 from the data of the unenhanced image of FIG. 2 that was a CTA image: 256×256×200 voxel, voxel size 0.62×0.62×0.5 mm with seven scales distributed in range 0.5-4 mm. The top bar in each example depicted in FIG. 9 shows processing time using an AMD Phenom™ II X6 1090T CPU with a Radeon™ HD 7970 GPU; the top bar in each example depicted in FIG. 9 shows processing time using an AMD Phenom™ II X6 1090T CPU with a Radeon™ HD 6970 GPU.

With reference to the steps shown in FIG. 4, processing times 910-940 are represented for different combinations of CPU and GPU processing where overall tracking and coordination of the results between stages for the set of voxels of the entire image is performed by the CPU. Processing times 910 reflect CPU multithread processing of the Gaussian convolution 210 with CPU single thread computation of the remaining steps 220, 230, 240 is represented at 910 in FIG. 9. Processing times 920 reflect GPU processing of the Gaussian convolution 210, Hessian matrix computation 220, and vesselness, i.e. tubularity, computation 240 with CPU single thread computation of the Eigen decomposition and sorting 230. Processing times 930 reflect GPU processing of the Gaussian convolution 210, Hessian matrix computation 220, and vesselness, i.e. tubularity, computation 240 with CPU multi-thread computation of the Eigen decomposition and sorting 230. Processing times 940 reflect GPU processing of all four computational steps, the Gaussian convolution 210, the Hessian matrix computation 220, the Eigen decomposition and sorting 230 and the vesselness, i.e. tubularity, computation 240.

For this example, the shortest observed execution time was associated with GPU execution of all four computational stages in connection with overall CPU control of the processing. However, computational times will vary with the extent of the tubular structures within the subject image. The four computational stages as shown in FIG. 4 are a chained procedure with the inter-stages processing on CPU, and re-iterate for a selected number of iterations with a collection of Gaussian kernel sizes. The creation of the Gaussian convolution kernel that is inherently once per iteration, is suitable to be performed on CPU, given its preference on fast compute throughput and lower data parallelism compared with on GPU. Another example is: the selection of largest vesselness, i.e. tubularity, value as in Equation 3 is also performed in CPU, while the utilization ratio of GPU is higher at the same time for performing vesselness, i.e. tubularity, calculation as in Equation 4. The work-sharing between the CPU and GPU can be in other format, based on the monitored compute unit's utilization ratio during run-time, memory bandwidth utilization, and the presence of amount of data parallelism or task parallelism.

The processing of the 3D Gaussian convolution of 3D images in 1D kernels consecutively for each dimension, instead of using one 3D kernel, greatly reduces the computational complexity of the overall processing. This is applicable to other numbers of dimensionalities. Coupling the reduced processing complexity with selective work sharing between computing resources such as CPUs and GPUs makes implementation of the method practical for smaller and handheld devices since the image enhancement is both fast and requires less power than attempting to provide such enhanced images through a more brute force computational process.

Figure 10:
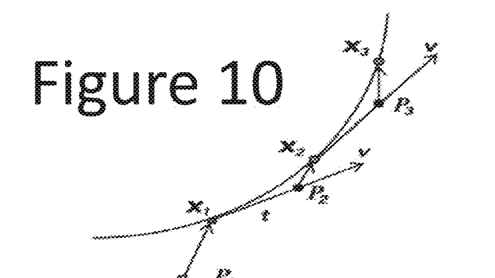
FIG. 10 is a graphic illustration of a ridge detection and traversal calculation.
Figure 11:
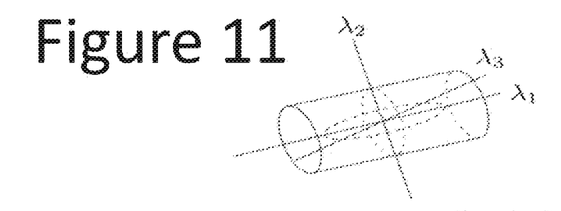
FIG. 11 is a graphic illustration of Eigen value relationships with respect to the ridge detection and traversal calculation of FIG. 10.

With reference to FIGS. 10 and 11, further details of a non-limiting example vasculature extraction method are provided. In this case, the vasculature extraction method may be represented as:

$$\Im(x) = (\vec{v}_2 \cdot \nabla I)^2 + (\vec{v}_3 \cdot \nabla I)^2 \approx 0$$

with ridge points of a vessel satisfying the following:

$$\vec{v}_2 \cdot \nabla I = 0 \quad \vec{v}_3 \cdot \nabla I = 0 \quad \lambda_2 < 0 \quad \lambda_3 < 0$$

Figure 12:
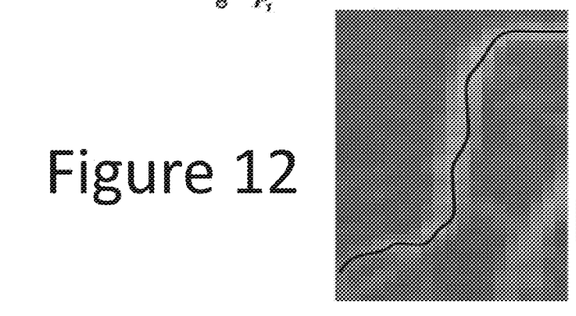
FIG. 12 is a two dimensional illustration of an example application of a ridgeness function.
Figure 13:
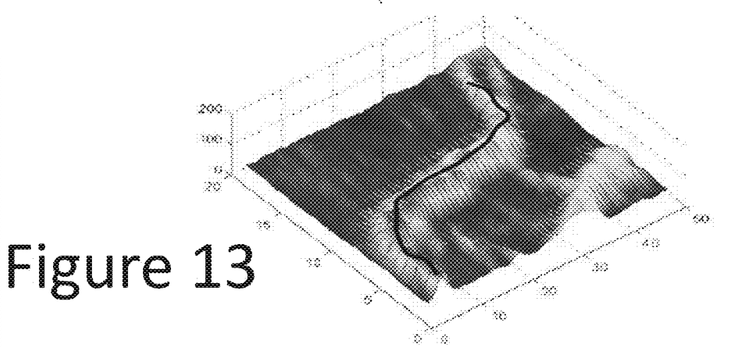
FIG. 13 is a three dimensional illustration of an example application of a ridgeness function, with the 3rd dimension representing the intensity of each voxel.

This includes a ridge detection and traversal calculation illustrated in FIG. 10 with the Eigen value relationship graphically illustrated in FIG. 11. Points along a ridge are determined from voxels of interest, x. Ridge points are determined using a gradient of the image I (i.e. ∇I). The ridgeness function $\Im(X)$ is based on detecting minimized intensity to determine if voxel x is on peak of the ridge. 2D and 3D graphic illustrations are provided in FIGS. 12 and 13.

A tubular extraction method, such as the example vasculature extraction algorithm, may apply a template-based approach such as represented by:

$$\mathcal{T}(x; r, x_0, v) = \frac{r^\gamma}{(\|x - x_0\|^2 - [(v^T)(x - x_0)]^2)^{\gamma/2} + r^\gamma}$$

Figure 14:
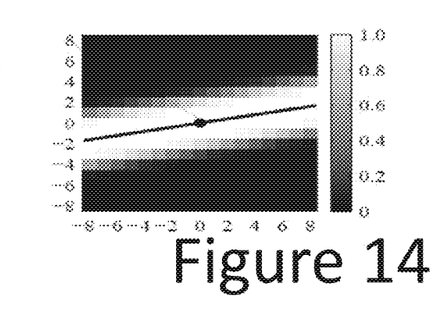
FIG. 14 is a graphic illustration of an example of image contrast and intensity variation of an artificial tubular template.
Figure 15:
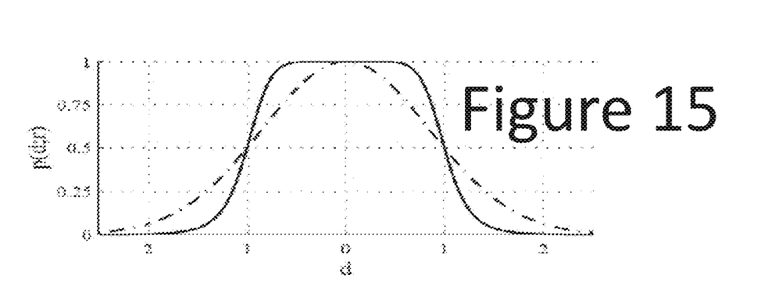
FIG. 15 is a graphic illustration of an example of graphical profile of the cross-sectional intensity for an artificial tubular template where the dotted line represents a Gaussian profile here as a comparison to show the characteristics of the artificial vessel cross-sectional profile in solid line.

An artificial tubular template is represented according to an image contrast and intensity scale, such as is exemplified in FIG. 14, and a graphical profile p(d, r), such is exemplified in FIG. 15 where d is distance and r is estimation of vessel radius.

Template fitting may be based on voxel x, center of template $x_0$, vector v for the tubular structure direction, and background intensity m, where a weighted W difference between template intensity and image intensity is determined. The value $\epsilon(x)$ represents an error value. This may be represented as:

$$I(x) = k\mathcal{T}(x; r, x_0, v) + m + \epsilon(x) \min_{r, x_0, v, k, m} \|W(r, x_0, v)[k\mathcal{T}(r, x_0, v) + m - I]\|^2$$

Figures 16A, 16B, 16C, 16D:
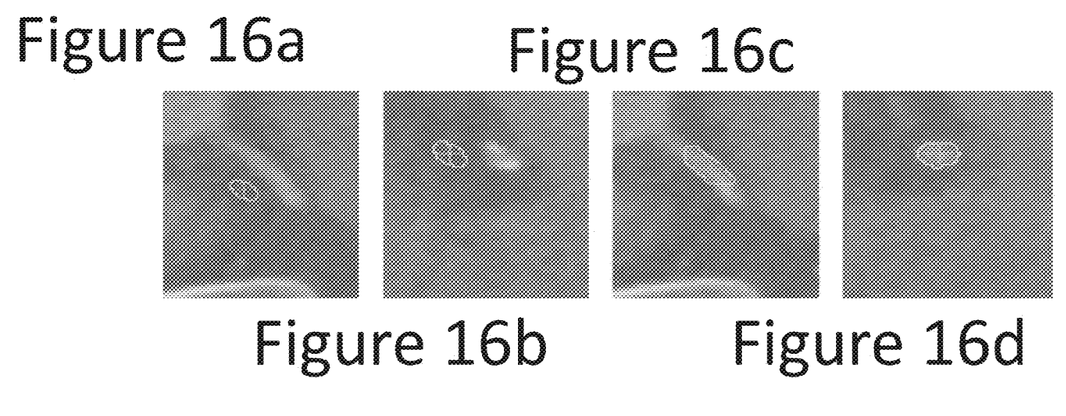
FIGS. 16a-16d are graphic illustrations of example images reflecting tubular structures indicated by an artificial tubular template with FIGS. 16a and 16b illustrating before the template registration with underlying image and FIGS. 16c and 16d illustrating after the registration, where the artificial tubular contours cover the small segment of vessels illustrated.

Graphic examples are provided as FIGS. 16 a-d.

FIGS. 16a and 16b show the views of a 3D image with tubular template as equal-intensity contours from two different viewpoints before the template fitting. FIGS. 16c and 16d show the same 3D image with tubular templates as equal-intensity contours after the template fitting by performing the minimization function above.

An example pseudo code methodology for determining vascular trees of an image S is as follows given Input as a vasculature image S and output are the vascular trees in that image.

Step 1: Parallel for each voxel v in the image S, compute the probability p(v) representing how likely a voxel v is part of the tubular structure.

Step 2: Sort all voxels based on p(v) value.

Step 3: Parallel for each voxel with a high probability (above a pre-defined threshold) of being in the tubular tree:

A: Extract the vascular branch from that voxel, noted as parent voxel, by processing a region around that voxel; if branching/divergence happens, parallel for each such children voxel.

B: Extract the tubular branch (e.g. vascular branch) from each child voxel also by processing a region around the voxel.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for image enhancement comprising:
    performing a Gaussian convolution between at least one Gaussian kernel and voxels of an input image;
    calculating a Hessian matrix of the convolution;
    performing an Eigen decomposition of the Hessian matrix to derive eigenvectors and eigenvalues of the voxels;
    sorting the eigenvectors according to the magnitude of the corresponding eigenvalues; and performing a tubularity computation to calculate the probability of a voxel of the image being part of a tubular structure representation in the image whereby voxels determined to be part of tubular structures are used to provide an enhanced depiction of the image.

2. The method of claim 1 wherein the Gaussian convolution is performed with respect to three one-dimensional kernels to produce a convolution L based on $$L=((I*Gx(\sigma))*Gy(\sigma))*Gz(\sigma)$$

where I is the input image, Gx, Gy, Gz are one-dimensional Gaussian kernels with respect to three dimensional space having dimensions x, y and z, and a is the size of the Gaussian kernel.

3. The method of claim 2 wherein the Hessian matrix is calculated as a matrix H in accordance with:

$$H = \begin{pmatrix} \frac{\partial^2 L}{\partial x \partial x} & \frac{\partial^2 L}{\partial x \partial y} & \frac{\partial^2 L}{\partial x \partial z} \\ \frac{\partial^2 L}{\partial y \partial x} & \frac{\partial^2 L}{\partial y \partial y} & \frac{\partial^2 L}{\partial y \partial z} \\ \frac{\partial^2 L}{\partial z \partial x} & \frac{\partial^2 L}{\partial z \partial y} & \frac{\partial^2 L}{\partial z \partial z} \end{pmatrix}.$$

4. The method of claim 2 where the Gaussian convolution is performed a first processing stage, the a Hessian matrix is calculated in a second processing stage, the Eigen decomposition and sorting the eigenvectors is performed in a third processing stage, and the tubularity computation is performed in a fourth processing stage.

5. The method of claim 4 performed by a plurality of computer resources of a device wherein one computer resource performs overall tracking and coordination of the results between stages for voxels of the image and another computer resource performs at least one of the processing stages.

6. The method of claim 4 wherein a central processing unit (CPU) performs overall tracking and coordination of the results between stages for voxels of the image and a graphics processing unit (GPU) performs at least one of the processing stages.

7. The method of claim 4 wherein a central processing unit (CPU) performs overall tracking and coordination of the results between stages for voxels of the image and a graphics processing unit (GPU) performs the four processing stages.

8. The method of claim 1 where the image is a biomedical image wherein performing a tubularity computation is performed by performing a vesselness computation to calculate the probability of a voxel of the image being part of a vascular structure representation in the image whereby voxels determined to be part of vascular structures are used to provide an enhanced depiction of the biomedical image.

9. The method of claim 8 wherein:
the Gaussian convolution is performed with respect to three one-dimensional kernels to produce a convolution L based on $$L=((I*Gx(\sigma))*Gy(\sigma))*Gz(\sigma)$$

where I is the input image, Gx, Gy, Gz are one-dimensional Gaussian kernels with respect to three dimensional space having dimensions x, y and z, and a is the size of the Gaussian kernel.

10. The method of claim 9 performed by a plurality of computer resources of a device wherein a central processing unit (CPU) performs overall tracking and coordination of the results between stages for voxels of the image and a graphics processing unit (GPU) performs at least one of the processing stages.

11. An apparatus for image enhancement comprising:
a first computational component configured to perform a Gaussian convolution between at least one Gaussian kernel and voxels of an input image;
a second computational component configured to calculate a Hessian matrix of the convolution;
a third computational component configured to perform an Eigen decomposition of the Hessian matrix to derive eigenvectors and eigenvalues of the voxels and to sort the eigenvectors according to the magnitude of the corresponding eigenvalues; and
a fourth computational component configured to perform a tubularity computation to calculate the probability of a voxel of the image being part of a tubular structure representation in the image whereby voxels determined to be part of tubular structures are used to provide an enhanced depiction of the image.

12. The apparatus of claim 11 wherein the first computational component is configured to perform the Gaussian convolution with respect to three one-dimensional kernels to produce a convolution L based on $$L=((I*Gx(\sigma))*Gy(\sigma))*Gz(\sigma)$$

where I is the input image, Gx, Gy, Gz are one-dimensional Gaussian kernels with respect to three dimensional space having dimensions x, y and z, and a is the size of the Gaussian kernel.

13. The apparatus of claim 12 wherein the second computational component is configured to calculate the Hessian matrix as a matrix H in accordance with:

$$H = \begin{pmatrix} \frac{\partial^2 L}{\partial x \partial x} & \frac{\partial^2 L}{\partial x \partial y} & \frac{\partial^2 L}{\partial x \partial z} \\ \frac{\partial^2 L}{\partial y \partial x} & \frac{\partial^2 L}{\partial y \partial y} & \frac{\partial^2 L}{\partial y \partial z} \\ \frac{\partial^2 L}{\partial z \partial x} & \frac{\partial^2 L}{\partial z \partial y} & \frac{\partial^2 L}{\partial z \partial z} \end{pmatrix}.$$

14. The apparatus of claim 12 wherein the four computational components are implemented in a central processing unit (CPU) of the apparatus.

15. The apparatus of claim 12 having a plurality of computer resources wherein one computer resource is configured to perform overall tracking and coordination of the results between the four computational components and at least one of the four computational components is implemented in a different computer resource.

16. The apparatus of claim 12 having a central processing unit (CPU) configured to perform overall tracking and coordination of the results between the four computational components and at least one of the four computational components in implemented in a graphics processing unit (GPU).

17. The apparatus of claim 12 having a central processing unit (CPU) configured to perform overall tracking and coordination of the results between the four computational components and the four computational components are implemented in a graphics processing unit (GPU).

18. The apparatus of claim 12 having a central processing unit (CPU) configured to perform overall tracking and coordination of the results between the four computational components and to selectively implement the four computational components.

19. The apparatus of claim 18 further comprising an input device configured to receive the voxels of the input image and an output device configured to output voxels of the processed image.

20. A non-transitory computer readable medium having stored thereon a program that when executed performs the following method steps:
- performing a Gaussian convolution between at least one Gaussian kernel and voxels of an input image;
- calculating a Hessian matrix of the convolution;
- performing an Eigen decomposition of the Hessian matrix to derive eigenvectors and eigenvalues of the voxels;
- sorting the eigenvectors according to the magnitude of the corresponding eigenvalues; and
- performing a tubularity computation to calculate the probability of a voxel of the image being part of a tubular structure representation in the image whereby voxels determined to be part of tubular structures are used to provide an enhanced depiction of the image.

21. The non-transitory computer readable medium of claim 20 wherein the Gaussian convolution is performed with respect to three one-dimensional kernels to produce a convolution L based on $$L=((I*Gx(\sigma))*Gy(\sigma))*Gz(\sigma)$$

where I is the input image, Gx, Gy, Gz are one-dimensional Gaussian kernels with respect to three dimensional space having dimensions x, y and z, and σ is the size of the Gaussian kernel.

22. The non-transitory computer readable medium of claim 21 wherein the Hessian matrix is calculated as a matrix H in accordance with:

$$H = \begin{pmatrix} \frac{\partial^2 L}{\partial x \partial x} & \frac{\partial^2 L}{\partial x \partial y} & \frac{\partial^2 L}{\partial x \partial z} \\ \frac{\partial^2 L}{\partial y \partial x} & \frac{\partial^2 L}{\partial y \partial y} & \frac{\partial^2 L}{\partial y \partial z} \\ \frac{\partial^2 L}{\partial z \partial x} & \frac{\partial^2 L}{\partial z \partial y} & \frac{\partial^2 L}{\partial z \partial z} \end{pmatrix}.$$

23. The non-transitory computer readable medium of claim 20 where the Gaussian convolution is performed in a first processing stage, the Hessian matrix is calculated in a second processing stage, the Eigen decomposition and sorting the eigenvectors is performed in a third processing stage, and the tubularity computation is performed in a fourth processing stage wherein the program controls a central processing unit (CPU) to perform overall tracking and coordination of the results between stages for voxels of the image and a graphics processing unit (GPU) to perform at least one of the processing stages.

24. A storage medium having an enhanced image produced in accordance with the method of claim 1 stored therein.

25. A storage medium having an enhanced biomedical image produced in accordance with the method of claim 8 stored therein.

26. A storage medium having an enhanced biomedical image produced in accordance with the method of claim 9 stored therein.

* * * * *